(12) United States Patent
Kruempelmann et al.

(10) Patent No.: US 12,730,796 B2
(45) Date of Patent: Sep. 8, 2026

(54) CUSTOMIZING REPOSITORY IN A TABLE BASED CUSTOMIZING SCENARIO

(71) Applicant: SAP SE, Walldorf (DE)

(72) Inventors: Wulf Kruempelmann, Altlussheim (DE); Volker Zirkel, Mannheim (DE)

(73) Assignee: SAP SE, Walldorf (DE)

( * ) Notice: Subject to any disclaimer, the term of this patent is extended or adjusted under 35 U.S.C. 154(b) by 61 days.

(21) Appl. No.: 18/062,461

(22) Filed: Dec. 6, 2022

(65) Prior Publication Data

US 2024/0184771 A1 Jun. 6, 2024

(51) Int. Cl.

*G06F 16/23* (2019.01)
*G06F 16/21* (2019.01)
*G06F 16/22* (2019.01)

(52) U.S. Cl.

CPC ........ *G06F 16/2379* (2019.01); *G06F 16/219* (2019.01); *G06F 16/2282* (2019.01)

(58) Field of Classification Search

CPC . G06F 16/2379; G06F 16/219; G06F 16/2282
See application file for complete search history.

(56) References Cited

U.S. PATENT DOCUMENTS 6,631,386 B1 * 10/2003 Arun .................... G06F 16/219 707/999.203
7,603,393 B1 10/2009 Cote et al.
2014/0279903 A1 * 9/2014 Hsiao .................. G06F 16/2379 707/638
2017/0060878 A1 * 3/2017 Demant ................ G06F 16/211
2017/0103226 A1 * 4/2017 Eberlein ............... G06F 21/629
2017/0161511 A1 * 6/2017 Eberlein ............. G06F 21/6218
2019/0258468 A1 * 8/2019 Chanda .............. G06F 11/1433
2021/0382708 A1 12/2021 Sagal et al.

FOREIGN PATENT DOCUMENTS

WO WO-2022212420 A1 10/2022

OTHER PUBLICATIONS

Extended European Search Report issued in European Application No. 23213717.4-1203, mailed Apr. 3, 2024, 8 pages.

* cited by examiner

*Primary Examiner* — Apu M Mofiz
*Assistant Examiner* — Husam Turki Samara
(74) *Attorney, Agent, or Firm* — Mintz Levin Cohn Ferris Glovsky and Popeo, P.C.

(57) ABSTRACT

In some implementations, there is provided a computer-implemented method including receiving a change request indicating a change to at least a portion of a database table at a database; in response to the change request, sending to a repository a query including an identity of the database table, a version information for the database table, and a change data for the database table; calling a function to determine whether the version information of the database table is mapped to a branch as a flat file of a branch store at the repository; and in response to the branch store not including the branch, opening the branch at the branch store and storing at least the change data in the branch of the branch store. Related system, methods, and articles of manufacture are also disclosed.

15 Claims, 7 Drawing Sheets

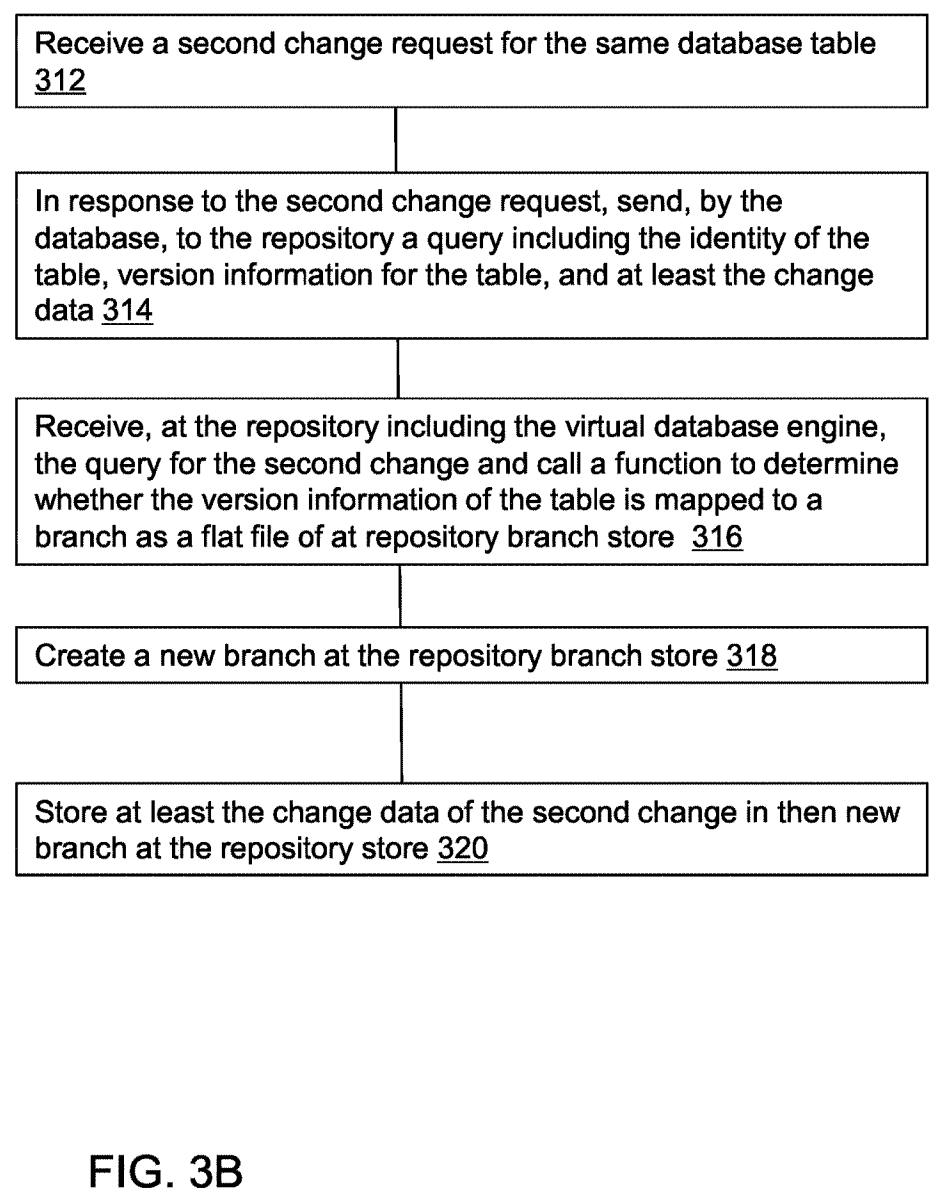

Receive a second change request for the same database table 312

In response to the second change request, send, by the database, to the repository a query including the identity of the table, version information for the table, and at least the change data 314

Receive, at the repository including the virtual database engine, the query for the second change and call a function to determine whether the version information of the table is mapped to a branch as a flat file of at repository branch store 316

Create a new branch at the repository branch store 318

Store at least the change data of the second change in then new branch at the repository store 320

FIG. 3B

CUSTOMIZING REPOSITORY IN A TABLE BASED CUSTOMIZING SCENARIO

TECHNICAL FIELD

This disclosure relates generally to deployment technology including multi-cloud technology.

BACKGROUND

Database management systems have become an integral part of many computer systems. For example, some systems handle hundreds if not thousands of transactions per second (which in-turn can generate over time a large volume of corresponding data). On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance including use of resources, such as memory and storage, as well as other challenges such as version management, audit support, and the like.

SUMMARY

In some implementations, there is provided a computer-implemented method including receiving a change request indicating a change to at least a portion of a database table at a database; in response to the change request, sending to a repository a query including an identity of the database table, a version information for the database table, and a change data for the database table; calling a function to determine whether the version information of the database table is mapped to a branch as a flat file of a branch store at the repository; and in response to the branch store not including the branch, opening the branch at the branch store and storing at least the change data in the branch of the branch store.

In some variations, one or more of the features disclosed herein including the following features can optionally be included in any feasible combination. The method may also include receiving a second change request indicating a second change to at least a second portion of the database table at the database. The method may also include in response to the second change request, sending to the repository a second query including the identity of the database table, a second version information for the database table, and a second change data for the database table. The method may also include calling the function to determine whether the version information of the database table is mapped to the branch as the flat file of the branch store at the repository. In response to the version information not mapping to the branch, the method may also include opening a second branch of the branch at the branch store and storing at least the change data in the second branch of the branch store. The calling the function may further include coupling the database and the repository using OData protocol. The mapping of the version information of the database table to the branch of the branch store may be performed via the OData protocol.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 3A, 3B, and 3C depict an example of a process for using a repository to store customizations to database tables, in accordance with some embodiments.

DETAILED DESCRIPTION

In many system, such as an enterprise resource planning (ERP) system, there may be associated database tables, some of which may include master data, application data, and/or the like. A database table may include configuration information specific to a given end-user or tenant. For example, the configuration information may be customized in view of the end-user/tenant processes and stored in a database table, such as a customization table. Over the lifecycle of the system, there may be thousands and thousands (or more) changes to database tables including the customization tables, for example. But tracking, auditing, and/or switching between these changes may not be possible in the ERP system. In some embodiments, there is provided a repository to track and store changes to the database tables. The repository includes (1) a database engine to provide a database interface towards the system (which includes the database tables that are the subject of the changes) and (2) a repository of flat files structured into branches to store each version of a given table.

Before providing additional details regarding the repository, the following provides an example of a system environment.

Figure 1:
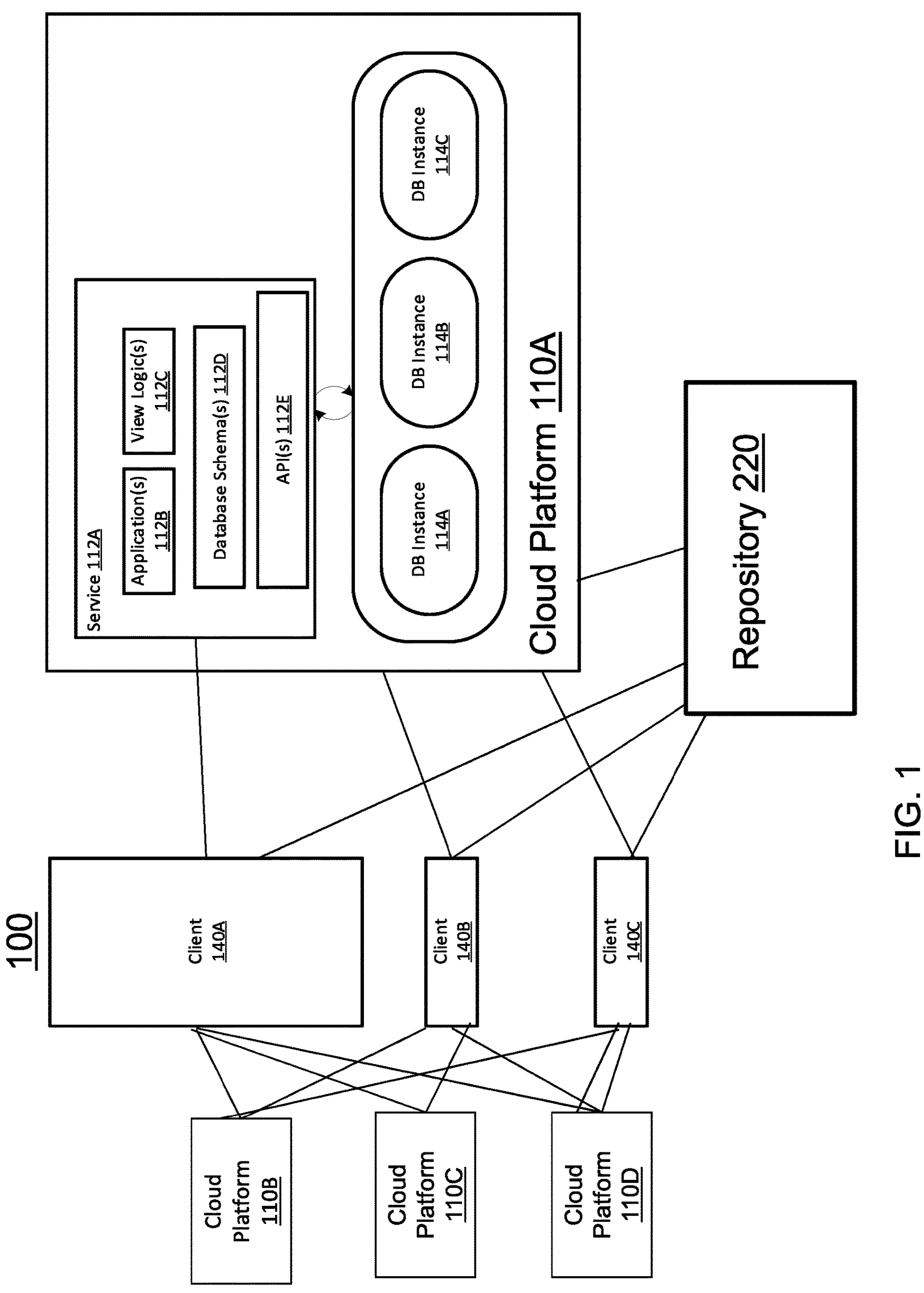
FIG. 1 depicts a diagram illustrating an example of a system, in accordance with some embodiments.

FIG. 1 depicts a diagram illustrating an example of a system 100 consistent with some implementations of the current subject matter. Referring to FIG. 1, the system 100 may include a plurality of cloud platforms 110A-D. Each of the cloud platforms may provide resources that can be shared among a plurality of tenants. For example, the cloud platforms 110A-D may be configured to provide a variety of services including, for example, software-as-a-service (SaaS), platform-as-a-service (PaaS), infrastructure as a service (IaaS), database as a service (DaaS), and/or the like, and these services can be accessed by one or more tenants (labeled clients) of the cloud platform.

The system 100 includes a repository 220, which includes a database engine to provide a database interface and a repository of flat files structured into branches to store each version of a given table changed at the system 100.

In the example of FIG. 1, the system 100 includes a first tenant 140A, a second tenant 140B, and a third tenant 140C, although other quantities of tenants (which as noted are labeled as tenants) may be implemented as well on the cloud platform 110A. A user may access the client, and the clients may each comprise a user device (e.g., a computer including an application such as a browser or other type of application). And, the clients may each access, via the Internet and/or other type of network or communication link(s), at least one of the services at a cloud platform, such as cloud platform 110A-D. In some implementations, each of the clients/tenants 140A-C represents a separate tenant at the cloud platform 110A for example, such that a tenant's data is not shared with other tenants (absent permission from a tenant). Alternatively, each of the tenants 140A-C may represent a single tenant at the cloud platform 110A, such that the tenants do share a portion of the tenant's data, for example.

The cloud platform 110A may include resources, such as at least one computer (e.g., a server), data storage, and a network (including network equipment) that couples the computer(s) and storage. The cloud platform may also include other resources, such as operating systems, hypervisors, and/or other resources, to virtualize physical resources (e.g., via virtual machines), provide deployment (e.g., via containers) of applications (which provide services, for example, on the cloud platform, and other resources.

In the case of a cloud platform being a so-called "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In the example of FIG. 1, the cloud platform 110A includes a service 112A, which is provided to for example the client 140A (or one of the other clients 140B). This service 112A may be deployed via a container, which provides a package or bundle of software, libraries, configuration data to enable the cloud platform to deploy during runtime the service 112A to, for example, one or more virtual machines that provide the service at the cloud platform. In the example of FIG. 1, the service 112A is deployed during runtime, and provides at least one application such as an application 112B (which is the runtime application providing the service at 112A and served to the client 140A). To illustrate further, client 140A may access the application 112B to view data and/or query data stored in a database instance 114A, for example.

The service 112A may also provide view logic 112C. The view logic (also referred to as a view layer) links the application 112B to the data in the database instance 114A, such that a view of certain data in the database instances is generated for the application 112B. For example, the view logic may include, or access, a database schema 112D for database instance 114A in order to access at least a portion of at least one table at the database instance 114A (e.g., generate a view of a specific set of rows and/or columns of a database table or tables). In other words, the view logic 112C may include instructions (e.g., rules, definitions, code, script, and/or the like) that can define how to handle the access to the database instance and retrieve the desired data from the database instance.

The service 112A may include the database schema 112D. The database schema 112D may be a data structure that defines how data is stored in the database instance 114A. For example, the database schema may define the database objects that are stored in the database instance 114A. The view logic 112C may provide an abstraction layer between the database layer (which include the database instances 114A-C, also referred to more simply as databases) and the application layer, such as application 112B, which in this example is a multitenant application at the cloud platform 110A.

The service 112A may also include an interface 112E to the database layer, such as the database instance 114A and the like. The interface 112E may be implemented as an Open Data Protocol (OData) interface (e.g., HTTP message may be used to create a query to a resource identified via a URI), although the interface 112E may be implemented with other types of protocols including those in accordance with REST (Representational state transfer). In the example of FIG. 1, the database 114A may be accessed as a service at a cloud platform, which may be the same or different platform from cloud platform 110A. In the case of REST compliant interfaces, the interface 112E may provide a uniform interface that decouples the client and server, is stateless (e.g., a request includes all information needed to process and respond to the request), cacheable at the client side or the server side, and the like.

The database instances 114A-C may each correspond to a runtime instance of a database management system (also referred to as a database). One or more of the database instances may be implemented as an in-memory database (in which most, if not all, the data, such as transactional data, is stored in main memory). In the example of FIG. 1, the database instances are deployed as a service, such as a DaaS, at the cloud platform 110A. Although the database instances are depicted at the same cloud platform 110A, one or more of the database instances may be hosted on another or separate platform (e.g., on-premise) and/or another cloud platform. Moreover, the service provided at the cloud platform may include other types of applications, such user interface applications, and the like.

The cloud platforms 110A-D may (as noted) be implemented using different technologies. As such, a system having heterogeneous cloud platforms may include for example, deployments at a SAP cloud, Microsoft Azure™, Amazon Web Services™, Google Cloud Platform™ data centers, a private data center, and/or the like. The heterogeneous cloud platform technology represents a multi-cloud system. In the case of database instances and/or their clients, some may be deployed at different private data centers (each of which may have different cloud platform technology, protocols, and the like), while some may be deployed at private data centers.

Moreover, the databases instances at the cloud platform may rely on the same or different storage or database technology. For example, a database management system instance may be an online transaction processing (OLTP) system using a relational database system. An example of an OLTP system is the SAP S/4HANA™ enterprise resource planning (ERP) system. Furthermore, the database management system instance may operate using for example the same or different storage technology, such as a row-oriented database system, a column-oriented database system, or a hybrid row-column store approach. Alternatively, or additionally, the database management system instance may be for example an online analytic processing (OLAP) system. Applications of OLAP systems include business reporting for sales, marketing, management reporting, business process management (BPM), budgeting, forecasting, financial reporting, and/or other types of analytics. An example of the OLAP system is the SAP BW/4HANA™ data warehouse solution, which can be used to for example answer multi-dimensional analytical (MDA) queries.

Figure 2A:
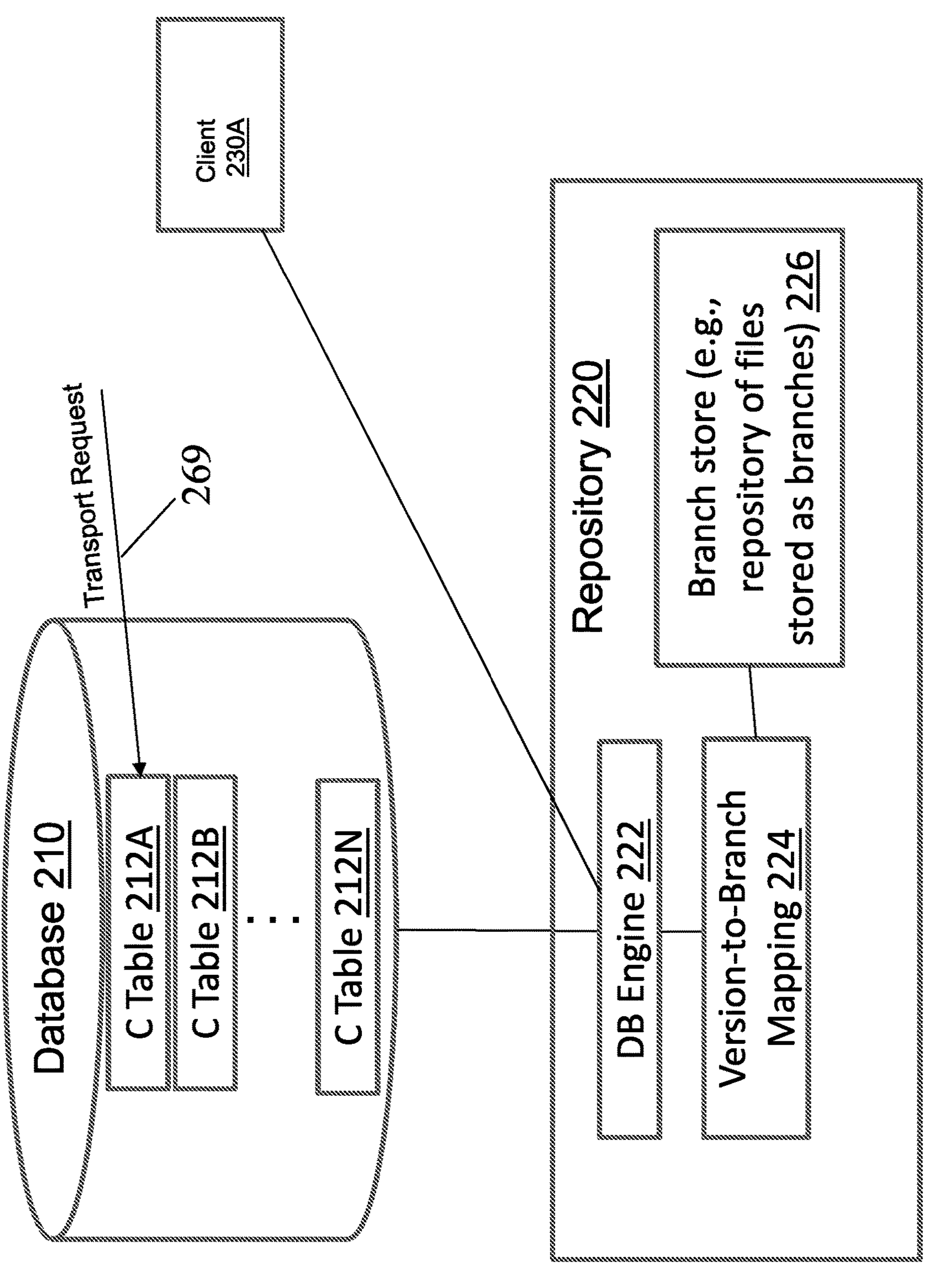
FIG. 2A depicts a system for file based source code management, in accordance with some embodiments.

FIG. 2A depicts an example of a system including a repository for file based source code management, in accordance with some embodiments.

In the example of FIG. 2A, the repository 220 is used to track and store changes to the database tables 212A-N of the database 210 (which may provide a persistence layer (such as a database instance 114A) to a service, such as service 112A, or an ERP system, and/or the like). The repository may include a database engine 222 that provides a database interface towards the system (which includes database 210) and a persistent store or repository in the form of a branch store 226 of flat files structured into branches that store each version of a given table.

The repository 220 may also include a version-to-branch mapping 224 function. In the example of FIG. 2A, the database engine 222 emulates the files at the branch store 226 as database tables and provides a database interface towards the system 210, for example. In some implementations, the database engine 222 may be called via a query. The files at the repository may be accessed (e.g., for read and/or write) via, for example, SQL statements for database tables. Alternatively, or additionally, the database engine 222 may be called via an OData service call (e.g., a get, post, put, patch, or delete verb carried by HTTP).

To illustrate further, an ERP system (e.g., service 112A at cloud platform 110A) may include a view layer (e.g., a view logic 112C) that decouples the ERP system from the persistency provided by the database 210 (see, e.g., database instance 114A). In this example, the ERP system may not use the database tables 212A-N directly but instead the ERP system uses a schema, such as the view layer, to read or write to the database tables. At FIG. 2A, the customizing tables 212A-N are coupled (via an OData service at API 112E) to the view layer (e.g., view logic 112C), and the OData connection (e.g., at API 112E) is coupled to the database engine 222. The database engine 222 may use or include a function or a table (e.g., version-to-branch mapping 224), which maps versions of tables (at database 210) with a technical branch identifier used at the branch store 226.

The OData coupling between the view logic at the database 210 (e.g., view logic 112C and API 112E which provides the OData interface) and the repository 220 (which also includes an OData interface) may be used to read a variable that describes the actual version of the database table 212A for example, convert this version variable (via, e.g., mapping 224) into the branch store 226, and get the data stored at the branch store 226. The variable may also be used for switching or changing between branches. For example, if the system (which includes database 210) writes data to the repository 220, a script (e.g., gitsq1) within the OData service is used to write data to a file and to import this file into the repository 220 and, in particular, a specific branch of the branch store.

In the example of FIG. 2A, the database 210 may include a plurality of database tables 212A-N (or "tables" for short). For example, the database 210 may have hundreds if not thousands of tables. Each of these tables may be changed over time. Moreover, some of the tables may be associated with an "operational" system, such as a live system currently in use, while other tables may be associated with a test system (and/or a development system). To illustrate with a simple example, table 212A may for a given object, such as Porsche, and for a given customer include cost and/or discount information for the object and customer. In this example, the operational system may be the system currently in use by an end-user to query table 212A for discounts. When there is a transport request 269 (e.g., a change request) to a database table, this change may change the content of at least a portion of the database table. Referring to the previous example, the transport request may seek to update the discount information at table 212A. Similarly, the other database tables may be changed from time to time. These database tables may be referred to as customizing tables as the database tables include data customized (or unique) to the end user.

In response to a change at a given table, such as table 212A, this may trigger a process to store in the repository 220 the change. For example, when a change to table 212A updates the table 212A to include a new discount, this may cause the change to be projected into the database 222 of the repository 220. For example, view logic 112C may, via an OData interface at 112E, send the change to the repository 222. In the example of FIG. 2A, the repository includes the database engine 222 as a front end but data is stored in a file based format at the branch store 226, rather than as database tables. For example, a given table of (or change to) the database 210 may be stored as a flat file at the branch store. Moreover, as changes occur to a table at the database 210, the changes are stored as different branches of the files at 226. As such, there is provided a version-to-branch mapping 224.

When a change occurs at the database table 212A for example, the change is provided to the repository 220, so that the repository can check to see if the database table has a corresponding file (or branch) stored at branch store 226 which can be used to store the change (e.g., either just the delta, such as the updated discount, or the entire table 212A). If so, the data for table 212A is posted (e.g., stored) in the file that corresponds to table 212A (and, in particular, to an open branch). This may include creating a new version (or branch) for the flat file stored at branch store 226. If there is no corresponding flat file (or branch) stored at 226 for the table 212A, the repository creates a branch and stores the change in the branch at branch store 226. As additional changes occur to table 212A, the repository stores the changes in branches as shown at FIG. 2B.

Figure 2B:
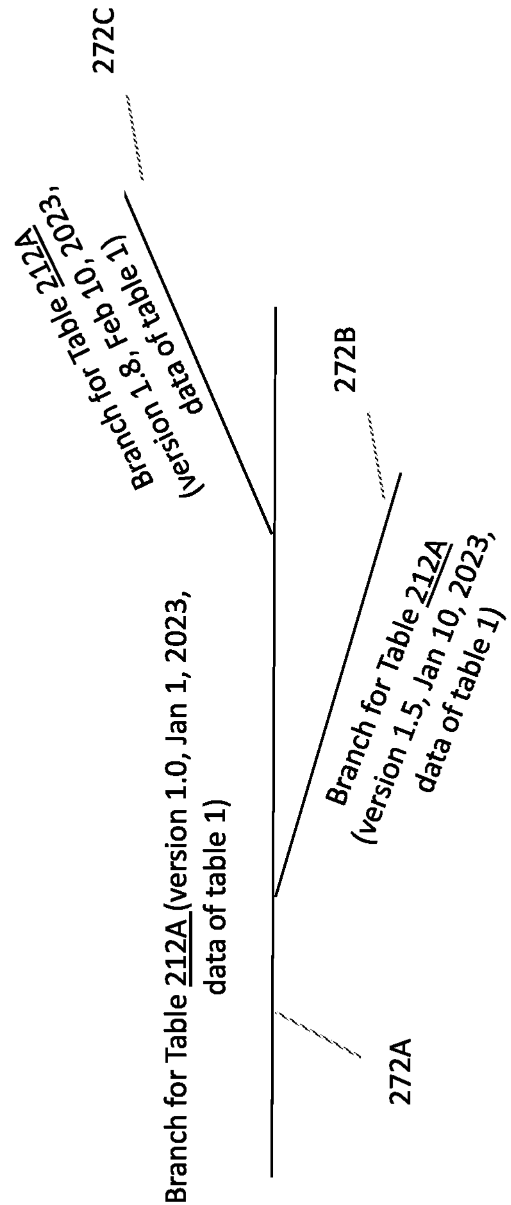
FIG. 2B depicts an example of a branch structure for storing files, in accordance with some embodiments.

Referring to FIG. 2B, the first branch 272A represents a commit (e.g., store) to a branch store 226 file of version 1.0 of table 212A (which represents the table at Jan. 1, 2023), the second branch 272B represents a commit to a file of the branch store of version 1.5 of table 212A (which represents the table at Jan. 10, 2023), and the third branch 272C represents a commit to a file of the branch store of version 1.8 of table 212A (which represents the table at Feb. 10, 2023). The branch store may provide a file based store structured into branches.

If for example an auditor seeks to determine what the state of database table 212A was at a given time, the auditor may access a client device 230A and send a query to the database engine 222. The query may be of the form: select a version of table 212A based on the date. The selection may specify that a "live" version (e.g., operational version) of table 212A rather than a test or development version of the table. In response to the query, the version-to-branch mapping 224 may identify which version was in use for the given date and identify the branch information to enable retrieval of the file at the identified branch of branch store 226. The file at the identified branch can be returned as a query response to the client 230A. Similarly, if for example an end user wants to know the discount available to a given customer on a certain date, the end user may access client device 230A and send a query to the database engine 222. In response to the query, the version-to-branch mapping 224 may identify which version was in use for the date specified in the query, and then identify the branch information to enable retrieval of the file at the identified branch at the branch store. The file at the identified branch can be returned as a query response to client 230A.

Figure 3A:
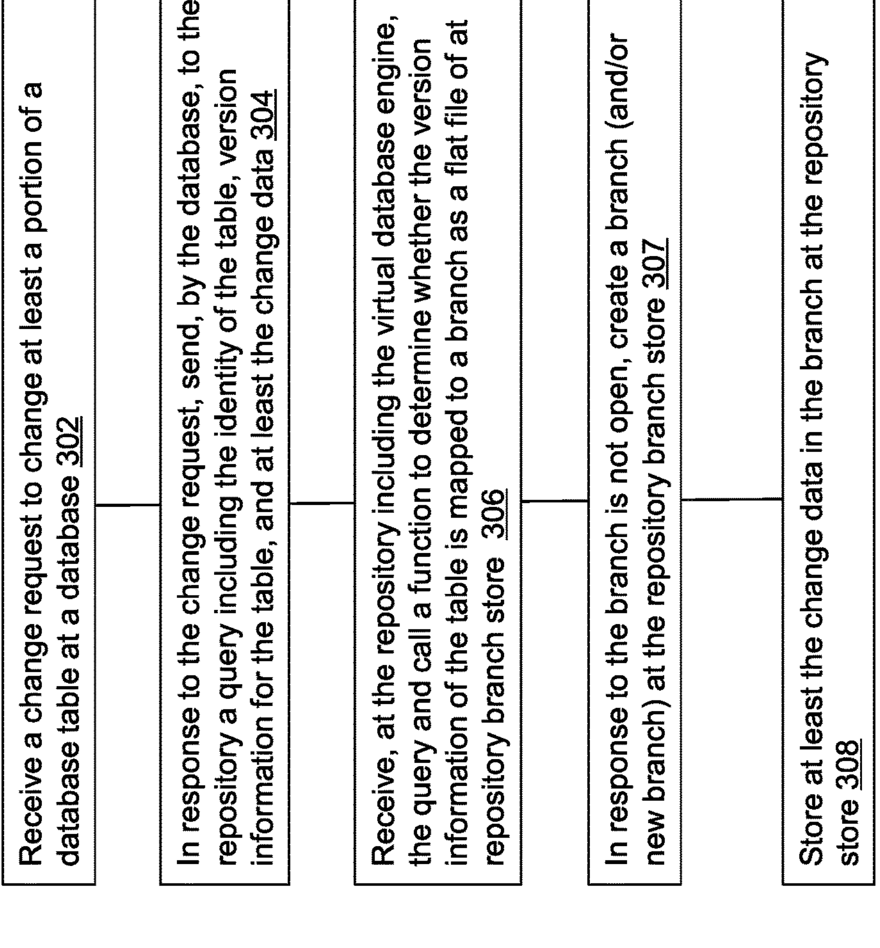
Figure 3C:
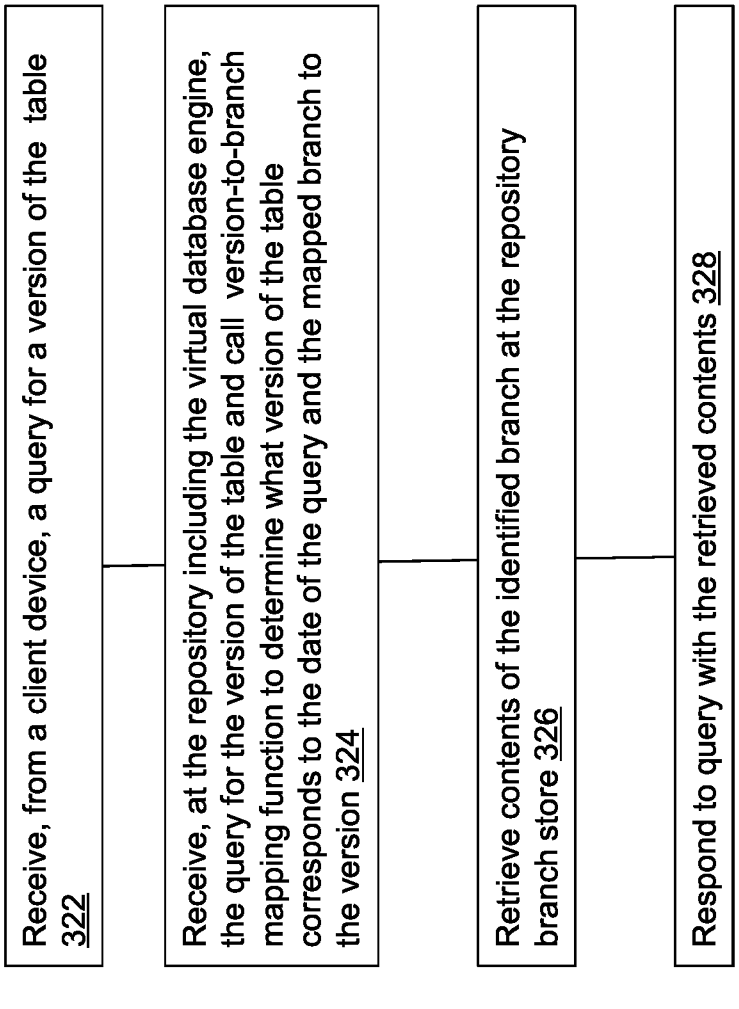

FIG. 3A depicts an example of a process for tracking version changes to database tables, in accordance with some embodiments.

At 302, a change request may be received to change at least a portion of a database table at a database. Referring to the example at FIG. 2A, the change request, such as the transport request 269, may be received by an ERP system including the database 210. The change request may change at least a portion of the database table 212A, for example. Referring to the example above, the change may update a value of the database table 212A from a 10% discount for a specific customer to 15% discount for a specific customer.

In response to the change request, the database 210 may sends, at 304, to the repository 220 a query including the identity of the table, version information for the table, and at least the change data. In some implementations, the query may be in the form of an SQL query. Alternatively, or additionally, the query may be via an OData interface (e.g., as an OData get, post, put, patch, or delete verb carried by HTTP).

At 306, the repository 220 may receive the query at the database engine 222 and may then call a function to determine whether the version of the table (which is indicated in the received query of 304) is mapped to a branch as a flat file of the branch store 226. For example, the function may be the version-to-branch mapping 224, which checks to see if the table has a flat file (e.g., branch) that is open at the branch store 226 and can be written to store the change data (which was included in the query received at 304). If not, the version-to-branch mapping 224 may open a new branch for the table at the branch store. For example, branch 272A may be opened as shown at FIG. 2B. This branch may be considered a "master" branch. At 308, the change data is stored at the branch (at branch store 226) identified by the version-to-branch mapping 224. In the case of Odata, the coupling between the view logic at the database 210 and the repository 220 may be used to read a variable (e.g., at version-to-branch mapping) that describes the actual version of the database table 212A and maps to a corresponding version variable at the branch store 226, so the data can be obtained from the branch store 226.

When a second change request is received at 312, this second change request may also be a change to at least a portion of the same database table as noted at 302. At 314, the change request triggers the database 210 to sends to the repository 220 a query including the identity of the table, version information for the table, and at least the change data as noted above at 304.

At 316, the repository 220 may receive the query at the database engine 222 and may then call a function to determine whether the version of the table is mapped to a branch as a flat file of the branch store 226. In this example, the version-to-branch mapping 224 checks to see if the table has a flat file that is open at the branch store and can be written to store the change data. Here, the version-to-branch mapping 224 creates, at 318, a new branch to store the change for the table. For example, the branch 272B may be opened as shown at FIG. 2B. Other changes to the same table may be stored as braches, such as branch 272C and so forth. At 320, the change data is stored at the new branch (of the branch store), which is identified by the version-to-branch mapping 224.

At 322, a query may be received for a version of a table. For example, a user at client 230A may send a query for data for a given table on a certain date. When this is the case, the repository 220 receives, at 324, the query at the database engine 222 and then calls the version-to-branch mapping 224 to determine what version of the table corresponds to the date of the query and then identifies the branch mapped to the version. This branch corresponds to a flat file of the repository 226. At 326, the contents of the branch are then retrieved from the branch store and returned by the repository 220 as a query response at 328.

Figure 4:
FIG. 4 depicts another example of a system, in accordance with some embodiments.
Figure 4:
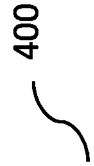
Figure 4:
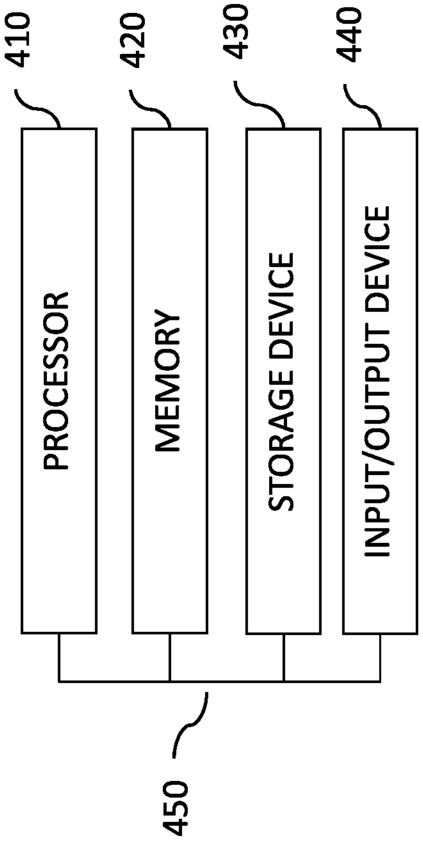

In some implementations, the current subject matter may be configured to be implemented in a system 400, as shown in FIG. 4. For example, the client refresh controller 190, system landscape, databases, and/or other aspects disclosed herein may be at least in part physically comprised on system 400. To illustrate further system 400 may further an operating system, a hypervisor, and/or other resources, to provide virtualize physical resources (e.g., via virtual machines). The system 400 may include a processor 410, a memory 420, a storage device 430, and an input/output device 440. Each of the components 410, 420, 430 and 440 may be interconnected using a system bus 450. The processor 410 may be configured to process instructions for execution within the system 400. In some implementations, the processor 410 may be a single-threaded processor. In alternate implementations, the processor 410 may be a multi-threaded processor.

The processor 410 may be further configured to process instructions stored in the memory 420 or on the storage device 430, including receiving or sending information through the input/output device 440. The memory 420 may store information within the system 400. In some implementations, the memory 420 may be a computer-readable medium. In alternate implementations, the memory 420 may be a volatile memory unit. In yet some implementations, the memory 420 may be a non-volatile memory unit. The storage device 430 may be capable of providing mass storage for the system 400. In some implementations, the storage device 430 may be a computer-readable medium. In alternate implementations, the storage device 430 may be a floppy disk device, a hard disk device, an optical disk device, a tape device, non-volatile solid state memory, or any other type of storage device. The input/output device 440 may be configured to provide input/output operations for the system 400. In some implementations, the input/output device 440 may include a keyboard and/or pointing device. In alternate implementations, the input/output device 440 may include a display unit for displaying graphical user interfaces.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising:
- receiving a change request indicating a change to at least a portion of a database table at a database;
- in response to the change request, sending to a repository a query including an identity of the database table, a version information for the database table, and a change data for the database table;
- calling a function to determine whether the version information of the database table is mapped to a branch as a flat file of a branch store at the repository; and
- in response to the branch store not including the branch, opening the branch at the branch store and storing at least the change data in the branch of the branch store.

Example 2: The computer-implemented method of Example 1 further comprising: receiving a second change request indicating a second change to at least a second portion of the database table at the database.

Example 3: The computer-implemented method of any of Examples 1-2 further comprising:
- in response to the second change request, sending to the repository a second query including the identity of the database table, a second version information for the database table, and a second change data for the database table;

Example 4: The computer-implemented method of any of Examples 1-3 further comprising:
- calling the function to determine whether the version information of the database table is mapped to the branch as the flat file of the branch store at the repository.

Example 5: The computer-implemented method of any of Examples 1-4 further comprising:
- in response to the version information not mapping to the branch, opening a second branch of the branch at the branch store and storing at least the change data in the second branch of the branch store.

Example 6: The computer-implemented method of any of Examples 1-5, wherein
- the calling the function further comprises coupling the database and the repository using OData protocol.

Example 7: The computer-implemented method of any of Examples 1-6, wherein the mapping of the version information of the database table to the branch of the branch store is performed via the OData protocol.

Example 8: A system comprising:
- at least one processor; and
- at least one memory including code which when executed by the at least one processor causes operations comprising:
  - receiving a change request indicating a change to at least a portion of a database table at a database;
  - in response to the change request, sending to a repository a query including an identity of the database table, a version information for the database table, and a change data for the database table;
  - calling a function to determine whether the version information of the database table is mapped to a branch as a flat file of a branch store at the repository; and
  - in response to the branch store not including the branch, opening the branch at the branch store and storing at least the change data in the branch of the branch store.

Example 9: The system of Example 8 further comprising:
- receiving a second change request indicating a second change to at least a second portion of the database table at the database.

Example 10: The system of any of Examples 8-9 further comprising:
- in response to the second change request, sending to the repository a second query including the identity of the database table, a second version information for the database table, and a second change data for the database table;

Example 11: The system of any of Examples 8-10 further comprising:
- calling the function to determine whether the version information of the database table is mapped to the branch as the flat file of the branch store at the repository.

Example 12: The system of any of Examples 8-11 further comprising:
- in response to the version information not mapping to the branch, opening a second branch of the branch at the branch store and storing at least the change data in the second branch of the branch store.

Example 13: The system of any of Examples 8-12, wherein the calling the function further comprises coupling the database and the repository using OData protocol.

Example 14: The system of any of Examples 8-13, wherein the mapping of the version information of the database table to the branch of the branch store is performed via the OData protocol.

Example 15: A non-transitory computer-readable storage medium including code which when executed by at least one processor causes operations comprising:
- receiving a change request indicating a change to at least a portion of a database table at a database;
- in response to the change request, sending to a repository a query including an identity of the database table, a version information for the database table, and a change data for the database table;
- calling a function to determine whether the version information of the database table is mapped to a branch as a flat file of a branch store at the repository; and in response to the branch store not including the branch, opening the branch at the branch store and storing at least the change data in the branch of the branch store.

Example 16: The non-transitory computer-readable storage medium of Example 15 further comprising:

receiving a second change request indicating a second change to at least a second portion of the database table at the database.

Example 17: The non-transitory computer-readable storage medium of any of Examples 15-16 further comprising:

in response to the second change request, sending to the repository a second query including the identity of the database table, a second version information for the database table, and a second change data for the database table;

Example 18: The non-transitory computer-readable storage medium of any of Examples 15-17 further comprising:

calling the function to determine whether the version information of the database table is mapped to the branch as the flat file of the branch store at the repository.

Example 19: The non-transitory computer-readable storage medium of any of Examples 15-18 further comprising:

in response to the version information not mapping to the branch, opening a second branch of the branch at the branch store and storing at least the change data in the second branch of the branch store.

Example 20: The non-transitory computer-readable storage medium of any of Examples 15-19, wherein the calling the function further comprises coupling the database and the repository using OData protocol, and wherein the mapping of the version information of the database table to the branch of the branch store is performed via the OData protocol.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

receiving, from a client device and at an enterprise resource planning (ERP) system executing on a cloud platform, a change request indicating a change to at least a portion of a database table at a database which provides a persistence storage layer to the ERP system, wherein the ERP system includes a view layer that decouples the ERP system from the database such that the ERP system cannot change the database table directly;

in response to the change request, sending, by the ERP system, a query to a database engine of a repository that is separate from the ERP system and configured to track and store changes to database tables of the database, the query including an identity of the database table, a version information for the database table, and a change data for the database table, wherein the database engine of the repository provides an interface to the database for the ERP system by emulating files in a branch store of the repository as the database tables of the database;

calling a version-to-branch mapping function being executed by the repository to determine whether the version information of the database table is mapped to a branch as a flat file of the branch store at the repository, wherein the version-to-branch mapping function maps versions of the database table to branch identifiers used at the branch store;

in response to the version-to-branch mapping function mapping the version information of the database table to an existing branch at the branch store:

reading a variable that describes a first version of the database table;

converting the variable into a technical branch identifier; and storing the change data in the existing branch corresponding to the technical branch identifier at the branch store;

in response to the version-to-branch mapping function not including a mapping for the version information of the database table, opening a new branch at the branch store and storing at least the change data in the new branch of the branch store;

receiving, from the client device, a version request to determine a version of the database table in use on a date specified by the client device;

in response to the version request, identifying, based on the version-to-branch mapping function, the version of the database table in use on the specified date and a corresponding branch at the branch store to enable retrieval of a file at the corresponding branch; and returning the file at the corresponding branch as a response to the client device.

2. The computer-implemented method of claim 1 further comprising:

receiving a second change request indicating a second change to at least a second portion of the database table at the database.

3. The computer-implemented method of claim 2 further comprising:

in response to the second change request, sending to the repository a second query including the identity of the database table, a second version information for the database table, and a second change data for the database table.

4. The computer-implemented method of claim 3 further comprising:

calling the version-to-branch mapping function to determine whether the second version information of the database table is mapped to any branch of the branch store at the repository; and in response to the second version information not mapping to any branch, opening a second branch for the second version information for the database table at the branch store and storing at least the change data in the second branch of the branch store.

5. The computer-implemented method of claim 1, wherein data is stored in a file-based format at the branch store.

6. A system comprising:

at least one processor; and at least one memory including code which when executed by the at least one processor causes operations comprising:

receiving, from a client device and at an enterprise resource planning (ERP) system executing on a cloud platform, a change request indicating a change to at least a portion of a database table at a database which provides a persistence storage layer to the ERP system, wherein the ERP system includes a view layer that decouples the ERP system from the database such that the ERP system cannot change the database table directly;

in response to the change request, sending, by the ERP system, a query to a database engine of a repository that is separate from the ERP system and configured to track and store changes to database tables of the database, the query including an identity of the database table, a version information for the database table, and a change data for the database table, wherein the database engine of the repository provides an interface to the database for the ERP system by emulating files in a branch store of the repository as the database tables of the database;

calling a version-to-branch mapping function being executed by the repository to determine whether the version information of the database table is mapped to a branch as a flat file of the branch store at the repository, wherein the version-to-branch mapping function maps versions of the database table to branch identifiers used at the branch store;

in response to the version-to-branch mapping function mapping the version information of the database table to an existing branch at the branch store:

reading a variable that describes a first version of the database table;

converting the variable into a technical branch identifier; and storing the change data in the existing branch corresponding to the technical branch identifier at the branch store;

in response to the version-to-branch mapping function not including a mapping for the version information of the database table, opening a new branch at the branch store and storing at least the change data in the new branch of the branch store;

receiving, from the client device, a version request to determine a version of the database table in use on a date specified by the client device;

in response to the version request, identifying, based on the version-to-branch mapping function, the version of the database table in use on the specified date and a corresponding branch at the branch store to enable retrieval of a file at the corresponding branch; and returning the file at the corresponding branch as a response to the client device.

7. The system of claim 6 further comprising:

receiving a second change request indicating a second change to at least a second portion of the database table at the database.

8. The system of claim 7 further comprising:

in response to the second change request, sending to the repository a second query including the identity of the database table, a second version information for the database table, and a second change data for the database table.

9. The system of claim 8 further comprising:

calling the version-to-branch mapping function to determine whether the second version information of the database table is mapped to any branch of the branch store at the repository; and in response to the second version information not mapping to any branch, opening a second branch for the second version information for the database table at the branch store and storing at least the change data in the second branch of the branch store.

10. The system of claim 6, wherein data is stored in a file-based format at the branch store.

11. A non-transitory computer-readable storage medium including code which when executed by at least one processor causes operations comprising:

receiving, from a client device and at an enterprise resource planning (ERP) system executing on a cloud platform, a change request indicating a change to at least a portion of a database table at a database which provides a persistence storage layer to the ERP system, wherein the ERP system includes a view layer that decouples the ERP system from the database such that the ERP system cannot change the database table directly;

in response to the change request, sending, by the ERP system, a query to a database engine of a repository that is separate from the ERP system and configured to track and store changes to database tables of the database, the query including an identity of the database table, a version information for the database table, and a change data for the database table, wherein the database engine of the repository provides an interface to the database for the ERP system by emulating files in a branch store of the repository as the database tables of the database;

calling a version-to-branch mapping function being executed by the repository to determine whether the version information of the database table is mapped to a branch as a flat file of the branch store at the repository, wherein the version-to-branch mapping function maps versions of the database table to branch identifiers used at the branch store;

in response to the version-to-branch mapping function mapping the version information of the database table to an existing branch at the branch store:

reading a variable that describes a first version of the database table;

converting the variable into a technical branch identifier; and storing the change data in the existing branch corresponding to the technical branch identifier at the branch store;

in response to the version-to-branch mapping function not including a mapping for the version information of the database table, opening a new branch at the branch store and storing at least the change data in the new branch of the branch store;

receiving, from the client device, a version request to determine a version of the database table in use on a date specified by the client device;

in response to the version request, identifying, based on the version-to-branch mapping function, the version of the database table in use on the specified date and a corresponding branch at the branch store to enable retrieval of a file at the corresponding branch; and returning the file at the corresponding branch as a response to the client device.

12. The non-transitory computer-readable storage medium of claim 11 further comprising:

receiving a second change request indicating a second change to at least a second portion of the database table at the database.

13. The non-transitory computer-readable storage medium of claim 12 further comprising:

in response to the second change request, sending to the repository a second query including the identity of the database table, a second version information for the database table, and a second change data for the database table.

14. The non-transitory computer-readable storage medium of claim 13 further comprising:

calling the version-to-branch mapping function to determine whether the second version information of the database table is mapped to any branch of the branch store at the repository; and in response to the second version information not mapping to any branch, opening a second branch for the second version information for the database table at the branch store and storing at least the change data in the second branch of the branch store.

15. The non-transitory computer-readable storage medium of claim 11, wherein data is stored in a file-based format at the branch store.

* * * * *